March 21, 1972    J. N. HALL    3,651,186
METHOD FOR FORMING BLOW MOLDED ARTICLES
OF ORIENTED THERMOPLASTIC MATERIAL
Filed March 29, 1968    2 Sheets-Sheet 1

JOHN N. HALL
INVENTOR.

BY *Edward S. Bell*

ATTORNEY

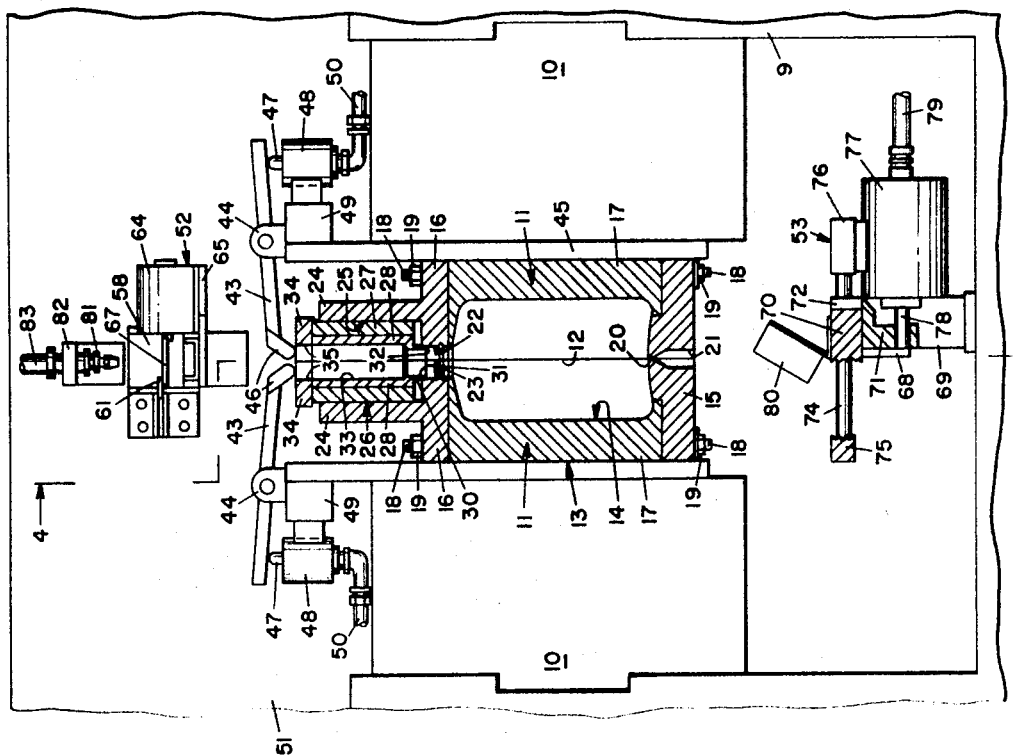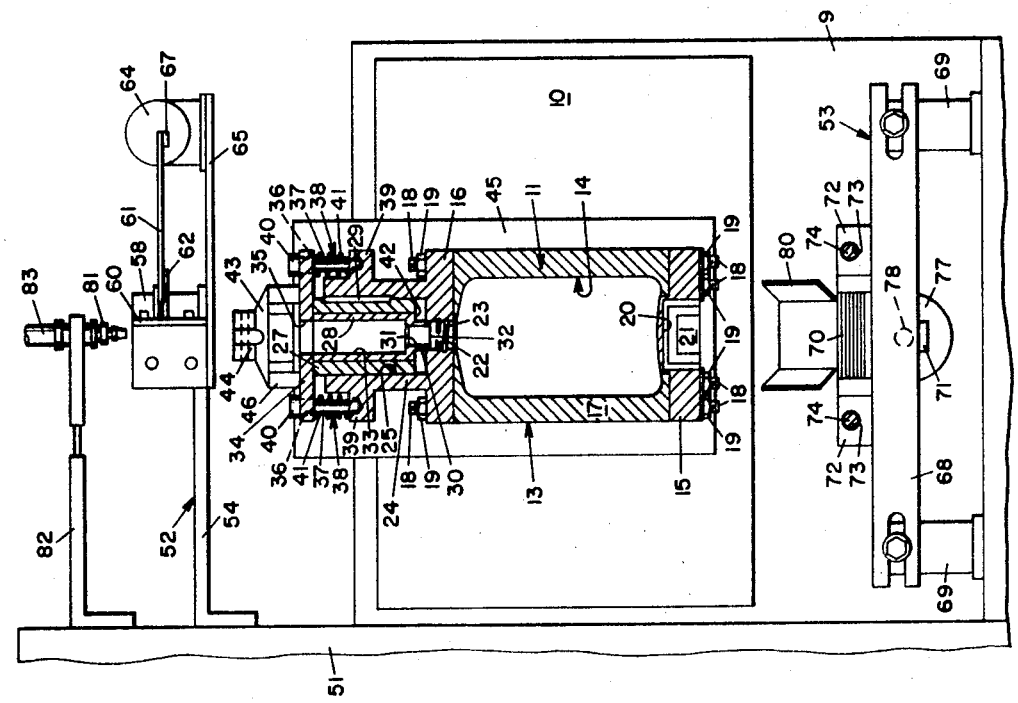

United States Patent Office 3,651,186
Patented Mar. 21, 1972

3,651,186
METHOD FOR FORMING BLOW MOLDED ARTICLES OF ORIENTED THERMOPLASTIC MATERIAL
John N. Hall, Brookside Park, Newark, Del., assignor to Hercules Incorporated, Wilmington, Del.
Filed Mar. 29, 1968, Ser. No. 717,083
Int. Cl. B29c *17/07*
U.S. Cl. 264—94                         2 Claims

ABSTRACT OF THE DISCLOSURE

This invention relates to blow molding hollow articles such as bottles of oriented plastic material and particularly to forming a well-defined peripheral projection means, such as a cap-receiving screw thread on the periphery of the bottle at the neck, and comprises shifting longitudinally that portion of the screw thread of the bottle after the bottle has been blown and while it is still under blowing pressure.

---

The present invention relates to blow-molded articles such as bottles of oriented thermoplastic material, and particularly a blow-molded article having lug means such as a screw thread for receiving a threaded cap.

In blow-molding hollow articles, such as containers, of oriented thermoplastic material from preformed tubes, the toughness or stiffness of the material makes it difficult to obtain good definition of minute mold features. While the material is soft at the blowing temperature, which is the orientation temperature of the material, it is still nevertheless quite strong and rigid. Thus, in comparison with blow molding an article from thermoplastic material at its melt temperature, a significantly higher blowing pressure is required to blow the article at its orientation temperature. It is also much more difficult to achieve a sharp definition in minute mold features, such as screw threads, because the material at its orientation temperature tends to bridge the thread-forming depressions or grooves in the mold rather than to flow into and thus take the shape of them.

The problem is exaggerated for example in forming screw threads in a bottle having a small neck and a relatively large body portion, since, in the neck, there is substantially no lateral expansion of the tube from which the bottle is formed. Normally, because of the reduction in the thickness of the walls as the tube is expanded into the shape of the bottle, the tube must be relatively thick initially in order to provide the desired thickness in the wall of the finished bottle. In many instances, the neck is so small relative to the cross section of the bottle, that it may be only big enough to accommodate the initial diameter of the tube and there is thus virtually no expansion of the tube at the neck of the bottle. Because the threads are formed on the neck of the bottle and since it is at this point that the tube is expanded the least during blowing, the tube is at its maximum thickness and therefore offers the greatest resistance to expansion into the minute mold features such as screw threads.

In accordance with the above, the objects of this invention are to provide a method for making well-defined peripheral projection means on a blow molded article, and more particularly, an article of oriented thermoplastic material. A specific object of this invention is to provide such a method that is especially adapted to form screw threads in the neck of a bottle blow molded from oriented thermoplastic material.

With the above and other objects in view, the present invention is hereinafter described with reference to the accompanying drawings, in which:

FIG. 2a is an elevational view of a section of tubing from which the bottle of FIG. 1 was made, while FIGS. 2b and 2c are views of the same section of tubing at different stages in making the bottle.

FIG. 3 is a vertical sectional view centrally of a blow molding apparatus embodying the present invention and adapted to practice the process thereof.

FIG. 4 is a vertical sectional view taken substantially on the line 4—4 of FIG. 3.

Figure 1:
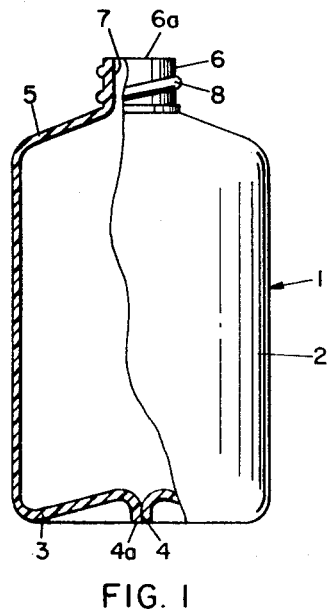
FIG. 1 is a view partly in elevation and partly in section of an article made in accordance with this invention.

With reference to the drawings, there is illustrated in FIG. 1 an article made in accordance with this invention. The illustrated article comprises a blow molded bottle 1 having a body portion 2 closed at its lower end by a bottom wall 3 which includes a pinch-off 4 or seal that is formed at the parting line of the mold in which the bottle was formed, which pinch-off has a free edge 4a along which it was severed from the tail portion of the tube from which the bottle was formed. At the upper end of the bottle 1 there is a peripheral projection on top wall 5 that converges toward a neck 6 terminating in an edge 6a along which the bottle was trimmed from the remainder of the tube from which it was formed. The neck 6 defines the mouth 7 of the bottle and has a screw thread 8 formed on the periphery thereof. The thread 8 is designed to cooperate with the threads of a threaded cap (not shown) that closes the mouth 7 of the bottle. In order to increase the strength of the threads 8, they may be of the so-called buttress configuration, that is, with the working edge thereof, which is the edge that engages the mating surface of the thread of the cap (the lower edge in FIG. 1), formed substantially flat and extending normal to the axis of the bottle.

The bottle 1 is formed of biaxially oriented thermoplastic material such as polypropylene. It will be obvious that other materials such as polyethylene, polyamides, etc., could also be used.

The bottle 1 is herein used for convenience in describing the present invention but it will be obvious that the invention is equally applicable to many forms of containers, or more generically, to many hollow articles. The cap-receiving screw thread 8 is also used in this disclosure merely as a convenient illustration of a prominent molded feature that is difficult to form accurately with oriented materials in a blow molding operation because the material resists expansion into the minute mold depressions for forming the same. Other examples of such molded features of the type to be formed in accordance with the present invention would be circumferentially arranged and spaced cap-receiving cam-like lugs, or a circular rib for receiving a snap-on cap or spout. Other molded features will be apparent to those skilled in the art.

In FIGS. 3 and 4, there is illustrated a blow molding machine for forming the bottle 1, which machine comprises a frame 9 upon which is mounted a pair of opposed platens 10 each of which carries a mold section 11. The platens 10 are mounted in the frame 9 for opposed linear movement between the open and closed positions of the mold sections 11. When the platens 10 are moved to the closed position, the opposed faces of the mold sections 11 are formed with a bottom plate 15, a top plate 16 having a cavity 14 conforming to the shape of the bottle 1. For convenience in making the mold 13, the mold sections 11 are found with a bottom plate 15, a top plae 16 and an intermediate portion 17. The plates 15 and 16 are formed of a material such as steel that is selected for its strength and serviceability while the intermediate portion 17 is formed of a material such as an aluminumfilled epoxy which can be readily formed or molded with the cavity 14, and the sections are held in a rigid assembled relation by through bolts 18 extending through the intermediate portions 17 and receiving nuts 19 on the ends thereof.

The bottom plates 15 of the mold sections 11 are formed in the usual manner with pinch-off edges 20 that cooperate when the mold is closed to form the pinch-off 4 at the bottom of the bottle 1. Beneath the edges 20, the bottom plates 15 are formed with reliefs 21 to accommodate that portion of the tube from which the article is formed that is below the pinch-off 4.

The top plates 16 of the mold sections 11 are formed with complemental semi-cylindrical mold cavities that together define the neck-forming cavity 22 of the mold, that is, the cavity within which the neck 6 of the bottle 1 is formed. The neck-forming cavity 22 is formed with depressions in the surface thereof, which depressions, as mentioned above, are, for purposes of illustration, in the form of a continuous thread groove 23 against which the thread 8 of the bottle 1 is formed.

Each of the mold sections 11 also has a semi-cylindrical wall 24 upstanding from the top plate 16, which walls define an upwardly open cylindrical well 25 when the mold 13 is closed. Mounted in the well 25 for endwise sliding is an insert 26 which, for bearing purposes, may include a bronze sleeve 27. The insert 26 is split along the same parting plane 12 as the mold 13 into two halves 28 that are carried respectively by the walls 24 of the top plates 16 and are secured therein by keys 29 (FIG. 4). At its lower end, the insert 26 has a cylindrical extension 30 that fits slidably within the upper portion of the neck-forming cavity 22 of the mold and has a longitudinal bore 31 axially thereof that is aligned with the axis of the neck cavity 22 and is sufficiently large to receive the stretched tube from which the bottle 1 is formed. The lower end of the extension 30 defines an annular shoulder 32 in the neck-forming cavity 22. Above the extension 30, the insert 26 has a longitudinal bore 33 that, like the bore 31, is aligned axially with the neck cavity 22.

Each half 28 of the insert 26 is secured at its upper end to a cross-piece 34 having a notch 35 in the edge thereof that constitutes clearance for the tube from which the bottle 1 is blown. At their outer ends, each of the cross-pieces 34 has a bore 36 that slidably receives the shank 37 of a pin 38 which is threaded at its lower end into a lug 39 integral with the respective wall 24, and which has a head 40 at its upper end that overlies the cross-piece 34. A spring 41 surrounds each of the pins 38 and biases the respective cross-piece 34 and thus the insert 26 upwardly to a stop position, which is herein referred to as the inoperative position of the insert, which is determined by the head 40 of the pin 38. The pins 38 are dimensioned so that, in the stop position, the bottom face 42 of the insert 26 is spaced from the opposed upper face of the top plate 16 of the mold 13.

The insert 26 is adapted to be depressed against the action of the springs 41 to a stop position, which, by way of example, may be with the bottom face 42 thereof in abutment with the opposed upper face of the top plate 16, thus moving the extension 30 downwardly in the neck-forming cavity 22 of the mold. The means for depressing the insert comprises a pair of levers 43 each of which is pivotally mounted intermediate its ends on a pivot lug 44 that is in turn secured on a mounting plate 45 disposed between the respective mold sections 11 and the associated platen 10. Each of the levers 43 has at one end a foot 46 that engages the top of the cross-piece 34 of one of the halves 28 of the insert and is bifurcated to span the bore 33 and thus to provide clearance for the tube from which the bottle 1 is formed. The opposite end of each of the levers 43 is acted upon by the plunger 47 of a fluid cylinder 48 that is carried by a mounting member 49 secured to the respective mounting plate 45. Fluid under pressure is introduced to each of the cylinders 48 through a conduit 50.

To effect endwise elongation of the tube from which the bottle 1 is formed, the frame 9 in the illustrated embodiment of the invention is mounted for vertical move on a stationary frame 51 and is adapted to be raised and lowered for example by hydraulic actuators (not shown). The tube is adapted to be clamped at its upper end by a clamp 52 that is mounted on the staticnary frame 51, while the lower end is seized by a clamp 53 on the movable frame 9 when the frame 9 is in its raised position and held while the frame 9 is moved to its lowered position.

Figure 5:
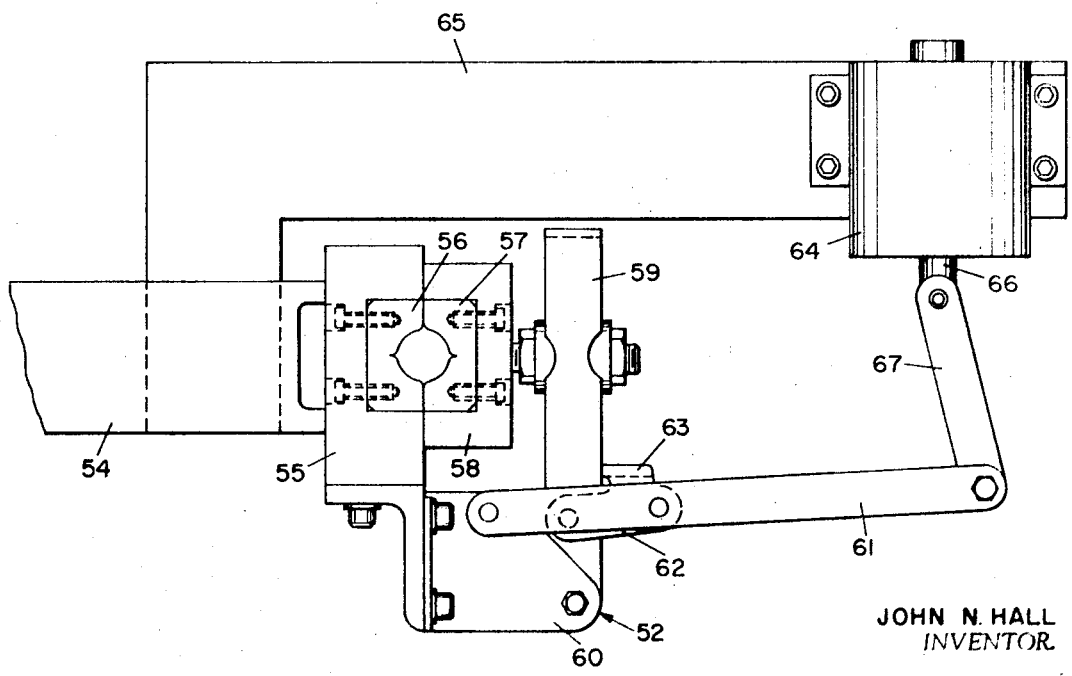
FIG. 5 is a plan view of the upper tube clamping means of the blow molding machine shown in FIG. 3.

More particularly, the stationary clamp 52, which is more fully illustrated in FIG. 5, is carried by a supporting arm 54 that is secured to the stationary frame 51 and which, at its free end, carries the clamp body member 55. The stationary jaw 56 of the clamp is secured to the body member 55 while the cooperating movable jaw 57 is secured in a block 58 that is mounted on the end of an arm 59. The arm 59 is pivotally mounted at its other end on a bracket 60 that is in turn secured to the body member 55. The movable jaw 57 is adapted to be swung to and locked in its clamping position relative to the stationary jaw 56 by a lever 61 that is also pivotally mounted on the bracket 60 and which is connected to the arm 59 by a link 62 pivoted at its opposite ends to the lever 61 and to the arm 59. The link 62 has a laterally extending stop arm 63 that abuts against the edge of the arm 59 when the clamp 52 is closed. The mechanics of the system are such that, when the clamp is closed and the link 62 is in its stop position, it is over-center relative to the lever 61 and the clamp is thus locked. The clamp is adapted to be unlocked by an air cylinder 64 mounted on a support 65 secured to the supporting arm 54 and having the plunger 66 thereof connected by a link 67 to the end of the lever 61. To operate the clamp 52, the tube from which the bottle is blown is placed against the stationary jaw 56 after which the lever 61 is moved counterclockwise as shown in FIG. 5 to close the movable jaw 57 and to lock it in the closed position. The movable jaw 57 is released by actuating the air cylinder 64 which, through the link 67, moves the lever 61 clockwise to unlock the link 62. To provide for fully opening the movable jaw 57 relative to the fixed jaw 56, a quickly disassembled connection such as a pin-and-hole connection can be made for example between the link 67 and lever 61.

The movable clamp 53 comprises a supporting bar 68 mounted at its ends upon a pair of posts 69 upstanding from the base portion of the frame 9. A fixed clamping jaw 70 is mounted on the bar 68 and is braced by a bracket 71. At the opposite ends of the jaw 70 are a pair of bearing blocks 72, each of which has a bore 73 in which a supporting rod 74 is mounted for endwise sliding movement. At their forward ends, the rods 74 are connected to a movable clamping jaw 75 while the rear ends thereof are connected to a bridge piece 76 that is secured to the casing of an air cylinder 77. The piston rod 78 of the cylinder 77 is secured to the bracket 71 so that, when the air is introduced into the cylinder through the conduit 79, the cylinder moves to the right in FIG. 3 relative to its stationary piston rod 78 and thus moves the movable jaw 75 into its clamping position relative to the fixed jaw 70 to direct the end of the tube from which the bottle is formed into the space between the jaws 70 and 75 when the clamp 53 is raised relative to the tube by the frame 9.

While blowing fluid may be introduced in any convenient manner into the tube from which the bottle is formed, there is shown in the drawings for purposes of illustration a fitting 81 that is carried by a resilient bracket 82 secured to the stationary frame 51 and connected by a conduit 83 to a source (not shown) of blowing fluid. The fitting 81 is disposed immediately above the clamp 52 and is adapted to cooperate in a fluid tight manner with the bore of the tube at its upper end, which, as noted below, is unheatd and is therefore relatively rigid.

Figures 2A, 2B, 2C:
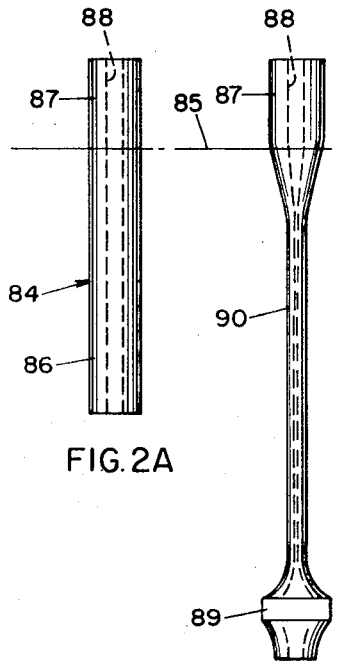

In operation, in order to make a bottle 1 of oriented polypropylene that has an outer diameter of, for example, two and one-half inches in the body portion 2 and of three-fourths of an inch at the neck 6, the starting tube, such as the tube 84 illustrated in FIG. 2a, may have an outer diameter of one inch and a bore or inner diameter of one-half of an inch and a wall thickness of one-fourth of an inch. That portion of the tube 84 that is below the plane 85 is heated to its orientation temperature which for polypropylene is about 160° C., to provide a heated portion 86 below the plane 85 from which the bottle 1 is formed and an unheated portion 87 above the plane 85 which is the portion secured in the clamp 52. This may be effected by suspending the tube 84 by the portion 87 with the portion 86 immersed in an oil bath. The unheated portion 87 is then secured in the clamp 52 with the fitting 81 in communication with the bore 88 of the tube and the machine, the cycling of which may be controlled by suitable automatic controls (not shown), is started.

When the machine is started, the mold 13 is open. Initially, the frame 9 rises and the lower end of the tube 84 is received between the jaws 70 and 75 of the clamp 53 with the guide 80 acting to direct the end of the tube if necessary. The clamp 53 is then closed to grip the tube 84 and thereby form a flattened gripping portion 89 near the lower end of the heated portion 86. When the frame 9 is lowered, the heated portion 86 is stretched endwise between the clamps 52 and 53 to provide a reduced diameter axially oriented portion 90. The endwise draw may be at a ratio in the order of two-to-one, so the outer diameter of the tube is thus reduced sufficiently so that it can be readily received within the neck-forming cavity 22 of the mold and in the bore 31 of the insert section 30. The mold 13 is then closed on the tube by advancing the platens 10. The unheated section 87 of the tube is sufficiently long so that, with the upper end in communication with the fitting 81, it extends through the clamp 52 and into the bore 33 of the insert 26 for a substantial distance, for example, for one-half the length of the bore 33. The oriented portion 90 extends through the remainder of the bore 33 as well as extends through the bore 31 of the insert extension 30 and completely through the neck cavity 22 and mold cavity 14. The diameter of the bore 33 must be sufficiently large to accommodate the original diameter of the unheated portion 87 of the tube while the bore 31 must be sufficiently large to accommodate only the oriented portion 90 which, since it has been drawn, is significantly reduced in diameter from the original diameter of the tube.

In closing the mold 13, the oriented section 90 of the tube 84 is pinched off at the edge 20 to form the pinch-off 4 of the bottle 1. Fluid under pressure is then introduced into the tube 84 through the fitting 81 and bore 88, at for example 130 p.s.i., to expand the axially oriented portion 90 into engagement with the adjacent mold surfaces, to form the bottle 1. At the same time, the section of the oriented portion 90 of the tube that is in the insert 26 is expanded to provide an extension 91 corresponding to the bore 31 of the insert extension 30, a bulbous section 92 corresponding to the bore 33 of the insert 26, and a shoulder 93 between them. The expansion of the tube circumferentially imparts orientation to the tube on an axis substantially transversely of the axis of the orientation imparted during the endwise drawing.

At the neck-forming portion of the mold 13, there is only limited circumferential expansion of the tube because the neck cavity 22 is only slightly larger than the outer diameter of the oriented portion 90 of the tube. While there is some reduction in the wall thickness of the tube in the neck area during the circumferential expansion because material is pulled from it into the top wall 5 of the bottle, the wall of the tube in the neck cavity 22 is still relatively heavy and thus rigid and resists the fluid pressure, tending to force the same into the thread groove 23. In accordance with this invention, it has been found that feeding additional material or shortening that portion of the tube corresponding to the neck cavity 22 of the mold while the bottle is still under the blowing pressure significantly improves the thread formation. For this purpose, the insert 26 is depressed by actuation of the cylinders 48, which in turn actuate the levers 43 to force the insert 26 downwardly against the bias of the springs 41. To insure that the two halves 28 of the insert 26 move down in unison, they may be pinned together such as by means of a pin-and-hole connection (not shown) that comprises a pin on one half that is received with a mating hole in the other half when the mold is closed. Such a connection may be the same as the usual pin-and-hole connection that is used to align the two halves of a mold when the mold is closed.

The tube is coupled to the insert 26 for movement therewith when the insert is depressed by the shoulder 32 at the end of the insert extension 30 over which the tube has been expanded by the blowing fluid to provide the step or ledge at the edge 6a. Additional coupling may be provided if desired by providing the bore 31 of the extension 30 with a friction-enhancing surface such as knurling or ribbing, or by providing the bore 33 of the insert with gripping means such as spikes (not shown) that bite into the surface of the tube in bore 33.

In the cycling of the machine, as soon as the tube has been expanded by the blowing fluid (for example about 0.75 second after the blowing fluid has been introduced), the clamp 52 is released by actuation of the cylinder 64. Substantially simultaneously therewith or shortly thereafter (for example, after a delay of 0.4 second) the cylinders 48 are actuated to depress the insert 26. The blowing fluid is left on for a period of several seconds (for example, twelve seconds) until the bottle has cooled enough to become set. The mold 13 is then opened and the bottle is removed, after which it is trimmed at the edge 4a of the pinch-off 4 and at the edge 6a of the neck 6, and the neck is reamed to provide a mouth 7 of uniform diameter.

A bottle produced, for example, from polypropylene, in accordance with the above described process is very clear and has significant advantages normally associated with oriented materials such as strength, rigidity, and impact resistance. At the same time, the bottle has a well-defined thread which is sufficiently strong to receive a threaded cap and to retain the same in a fluid-tight manner.

While it is not intended that the invention herein claimed should be limited to any theory of operation, it is believed that the following discussion will be helpful in understanding the invention.

Normally, in a blow molding operation for making biaxially oriented thermoplastic articles from the tubing that is initially drawn longitudinally, it must be held under tension endwise to prevent shrinkage induced by the fact that the tube is at its orientation temperature. Apparently, the stress imposed by this tension causes the material to resist expansion into the mold corners to provide well-defined molded features. Even though the tube is released after it is initially blown, these stresses are not relieved because of the frictional engagement of the tube with mold parts or because of the physical engagement of the expanded tube with shoulders such as at 6a or at 93 or other mold features, or because the pressure of the blowing fluid tends to resist thickening of the material that is associated with shrinkage, or by tension imposed upon the material by the blowing fluid. By physically shifting the material by means of the movable insert in accordance with this invention, the stress is positively relieved precisely at the point where the material tends to bridge the mold surfaces. The material can thus be forced readily into the corners and other mold characteristics that are difficult to fill. The physical engagement between the tube and the insert may be enhanced if desired by knurling or ribbing in the bore 31 or in the bore 33.

At the time the insert is actuated, the material in the neck-forming portion of the tube is still relatively hot and, upon release of the stress, can be readily forced into the shape of the mold feature. This is because the tube at this point is relatively thick and the cooling thereof by contact with the wall of the mold is proportionally less than it is with a thinner or circumferentially expanded material. At the same time, the insert is preferably actuated as soon as possible after the tube has been expanded in order to minimize cooling of it.

While the present invention is herein disclosed as related to the formation fo a lug means extending outwardly from the periphery of the bottle, it will be apparent that, to some extent, it will be equally applicable to oppositely extending mold features.

What I claim and desire to protect by Letters Patent is:

1. A method of blow molding an oriented thermoplastic article which includes a portion containing peripheral projection means in the surface thereof, said method comprising, providing a longitudinally oriented tube of thermoplastic material having an article-forming portion that is heated to its orientation temperature and is under tension, enclosing said heated article-forming portion of said tube in a mold, maintaining the tube under tension while in the mold to prevent longitudinal shrinking, said mold comprising an article-forming cavity which includes a portion containing peripheral projection forming means in the surface thereof, introducing fluid pressure into the entire article-forming portion of said tube to expand the same circumferentially, then shifting longitudinally the tube portion corresponding to said mold portion containing the peripheral projection forming means to decrease the longitudinal length of the same while maintaining the fluid pressure in the entire expanded tube whereby the tube portion corresponding to the peripheral projection forming means fills the same, and holding the mold closed for a period of time sufficient for the article to become cooled and set and thereafter opening the mold and removing the article therefrom.

2. A method in accordance with claim 1 in which the article-forming cavity defines a bottle having a neck at one end and said peripheral projection means defines a cap-receiving thread on said neck.

References Cited

UNITED STATES PATENTS

| 3,303,249 | 2/1967 | Strauss | 18—5 BA X |
| 3,311,684 | 3/1967 | Heider | 264—99 |
| 3,314,106 | 4/1967 | Latreille et al. | 18—5 BA |
| 3,435,107 | 3/1969 | Conrad | 264—274 X |

FOREIGN PATENTS

| 1,136,815 | 9/1962 | Germany | 264—94 |

ROBERT F. WHITE, Primary Examiner

T. J. CARVIS, Assistant Examiner

U.S. Cl. X.R.

18—5 BM

UNITED STATES PATENT OFFICE
CERTIFICATE OF CORRECTION

PO-1050 (5/69)

Patent No. U.S.P. 3,651,186  Dated March 21, 1972

Inventor(s) John N. Hall (Case 3)

It is certified that error appears in the above-identified patent and that said Letters Patent are hereby corrected as shown below:

Col. 2, Line 27 of p.p.; between "a" and "screw" should be inserted:
"peripheral projection or"

Col. 2, Lines 65-68 of p.p.; should read:
"sections 11 abut at a parting plane 12 provide a mold 13 having a cavity 14 conforming to the shape of the bottle 1. For convenience in making the mold 13, the mold sections 11 are formed with a bottom plate 15, a top plate 16 and an intermediate portion 17."

Col. 7, Line 7 of p.p.;
"fo" -- should be -- "of"

Signed and sealed this 11th day of July 1972.

(SEAL)
Attest:

EDWARD M. FLETCHER, JR.
Attesting Officer

ROBERT GOTTSCHALK
Commissioner of Patents